Figure 1:
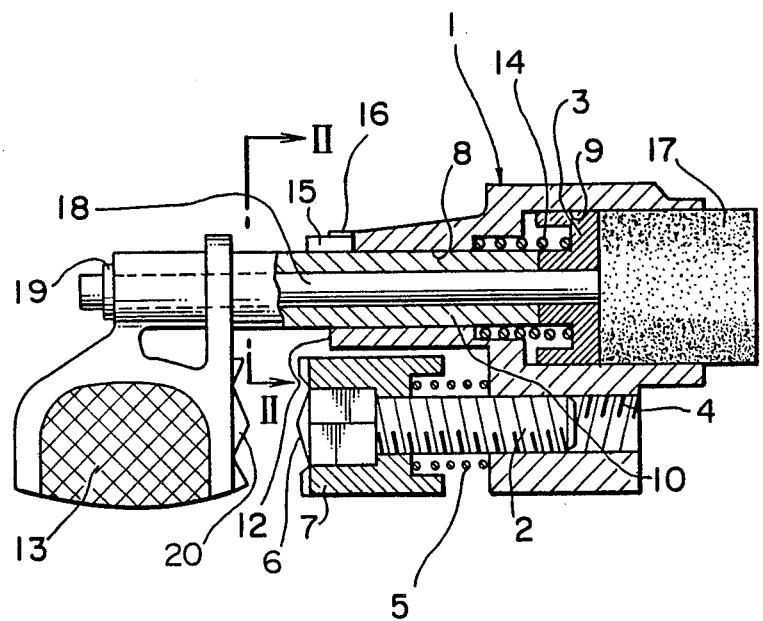

United States Patent [19]

Nagashima et al.

[11] Patent Number: 4,843,718
[45] Date of Patent: Jul. 4, 1989

[54] AUTOMATIC SHARPENER FOR CHAIN SAW

[75] Inventors: Akira Nagashima, Kawasaki; Junichi Akaike, Chofu, both of Japan

[73] Assignee: Kioritz Corporation, Tokyo, Japan

[21] Appl. No.: 230,970

[22] Filed: Aug. 11, 1988

[30] Foreign Application Priority Data

Aug. 13, 1987 [JP] Japan .............. 62-124331[U]

[51] Int. Cl.[4] ............................... B23D 63/16
[52] U.S. Cl. ...................... 30/138; 76/25 A; 76/37
[58] Field of Search .............. 76/25 A, 37; 30/138, 30/139

[56] References Cited

U.S. PATENT DOCUMENTS

| 3,301,098 | 1/1967 | Oehrli | 76/37 |
| 3,465,795 | 9/1969 | Tupper | 76/25 A |
| 3,596,689 | 8/1971 | Oehrli | 30/138 |
| 4,062,253 | 12/1977 | Dilworth | 76/25 A |
| 4,457,069 | 7/1984 | Close | 76/25 A |

Primary Examiner—Roscoe V. Parker
Attorney, Agent, or Firm—Browdy and Neimark

[57] ABSTRACT

An automatic sharpener for a chain saw in which a securing mechanism is released by a grip portion thereof, and a sleeve-like member is moved forward with respect to the main body by urging force of a spring so that the grindstone thereof can be automatically pushed forward from its retracted position upto the position at which the teeth of the saw chain are set, and a grindstone receiving body can be slightly moved forwardly or rearwardly with respect to the main body thereof by rotation of a screw.

2 Claims, 1 Drawing Sheet

U.S. Patent  Jul. 4, 1989  4,843,718

AUTOMATIC SHARPENER FOR CHAIN SAW

BACKGROUND OF THE INVENTION

This invention relates to an automatic sharpener for chain saws.

Saw chains of a chain saw are sometimes sharpened by an sharpener which pushes a grindstone from a retracted position to a position in a passage through which the teeth of the saw chain are moved, this position being the position at which the teeth of the saw chain are automatically set. A conventional automatic sharpener for chain saws is, for example, constituted in such a manner that a grindstone secured by its shaft is held at a retracted position by means of a compression spring, and when the teeth of the saw chain are set, the grindstone is pushed and held by the operator's finger against the force of the compression spring to the position at which the teeth of the saw chain are set. In order to adjust the setting of the grindstone, the dial of a setting adjustment portion disposed on the shaft of the grindstone is turned so that the shaft of the grindstone is moved slightly forward or rearward. In a conventional automatic sharpener of the type described above, it is necessary for the grindstone to be pushed to and then held against the force of a spring by the operator's finger at the position where the teeth are to be set. Furthermore, the structure of the setting adjustment portion is very complicated, and the size of the automatic sharpener is thus relatively large so that there are sometimes limitations when it is mounted on the main body of the chain saw.

SUMMARY OF THE INVENTION

It is therefore an object of the present invention is to provide an automatic sharpener for chain saws which can overcome the above-described problems experienced with the conventional devices, and whose structure is simple and is such as to be convenient for use.

An automatic sharpener for a chain saw according to the present invention comprises a main body to be mounted on a chain saw body; a grindstone receiving body which is urged forwardly with respect to the main body by a spring; a screw which is screwed into the main body and which is able to be rotated so as to move the grindstone receiving body forward or rearward with respect to the main body; a sleeve-like member which is supported by the main body in such a manner that it can be moved forward or rearward and can be turned so as to vary its angular position, and the rear end portion of which is projected rearwardly and outwardly from a rear end portion of the main body; a grindstone shaft which is rotatably supported by the sleeve-like member, whose front end portion inserted into the grindstone receiving body supports a grindstone, and the rear end portion of which is projected outwardly from the rear end portion of the sleeve-like member; a securing means for holding the grindstone at the rear position against the force of the spring, and a grip portion provided at the rear end portion of the sleeve-like member which is provided for the purpose of handling the securing means.

According to the structure of the present invention, when the securing means is released by the grip portion, the sleeve-like member is moved forward with respect to the main body by the urging force of the spring so that the grindstone is pushed forward from its retracted position and is moved to a predetermined position in a passage through which the teeth of the saw chain are moved, the position being the position at which the teeth of the saw chain are set. Furthermore, when the screw is turned in order to slightly move the grindstone receiving body forward or rearward with respect to the main body, the setting of the teeth with the use of the grindstone can be correctly adjusted.

Since not only setting of the grindstone at the position at which the teeth are to be set, that is, the movement of the grindstone forward, can be easily conducted, but also the grindstone moving portion and the portion for adjusting the setting of the teeth are individually provided, the overall structure can be simplified, and mounting and removing of the sharpener with respect to the chain saw body can be easily conducted. Furthermore, the rotation of the grindstone can be easily confirmed by observation of the rotation of the rear end portion of the grindstone shaft which projects outward over the rear end portion of the sleeve-like member.

BRIEF DESCRIPTION

Figure 2:
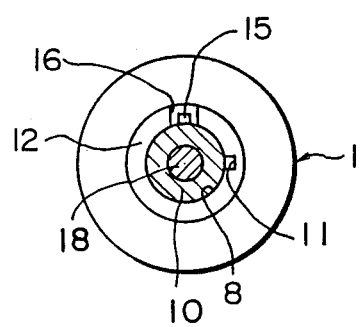

FIG. 1 is a cross-sectional view of an essential portion of an automatic sharpener of a chain saw according to an embodiment of the present invention; and FIG. 2 is a cross-sectional view taken along the line II—II shown in FIG. 1.

PREFERRED EMBODIMENT OF THE INVENTION

An embodiment of the present invention will now be described with reference to the accompanying drawings.

An automatic sharpener according to this embodiment comprises a main body 1 which is screwed and secured at the both sides thereof to the body of a chain saw (not shown). A screw 2 for adjusting the setting of the teeth of a saw chain (not shown) in a manner to be described later is screwed into the main body 1. The screw 2 is screwed into a threaded hole 4 formed in the main body 1. The screw 2 is urged by a compression coil spring 5 which is disposed such as to surround the screw 2, and the force of which is applied between the main body 1 and a head portion 7 of the screw 2 so that the screw 2 is held at the optional position in which it is screwed. The forward movement of a grindstone 17 is restricted by way of bringing an engagement surface 20 of a grip portion 13 into contact with an engagement surface 6 of the head portion 7 of the screw 2. Therefore, the axial position of the grindstone 17 projecting from the main body 1 can be varied by turning the screw 2 with respect to the main body 1.

The main body 1 is provided with a hole 8 which is formed substantially parallel to the abovedescribed threaded hole 4, and is also provided with a recess 9 which is a continuation of the front end portion of the hole 8 but has a larger diameter than the hole 8, the recess 9 and the hole 8 being formed concentrically. A sleeve-like member 10 is inserted into and supported by the hole 8 in such a manner that it can be moved in the axial direction, and such that it can be turned so as to vary its angular position. The front end portion of the sleeve-like member 10 is inserted into a grindstone receiving body 3 disposed in the recess 9. The sleeve-like member 10 projects rearwardly and outwardly from the rear end portion 12 of the main body 1. The rearwardly and outwardly projecting portion is integrally provided with a grip portion 13. The grindstone 17 is urged forward (rightward as viewed in FIG. 1) by a compression coil spring 14 which acts between the main body 1 and the grindstone receiving body 3. The sleeve-like member 10 is further provided with a projection 15 which projects radially, and which is disposed on the outer surface of the portion projecting rearwardly and outwardly from the rear end portion 12 of the main body 1. The projection 15 acts to prevent further forward movement of the sleeve-like member 10 by its being brought into engagement and contact with a securing groove 16 at the rear end portion 12 of the main body 1 due to the urging force applied by the compression coil spring 14 which acts on the sleeve-like member 10. That is, the projection 15 and the securing groove 16 together constitute a securing means for holding the grindstone 17 at the retracted position against the force of the compression coil spring 14. The hole 8 in the main body 1 is provided with a guide groove 11 formed radially and extending axially so that the sleeve-like member 10 can be moved forward when an operator of the chain saw pulls back the sleeve-like member 10 while holding the grip portion 13, thereby causing the projection 15 of the sleeve-like member 10 to be removed from the securing groove 16 in the main body 1 and also causing the projection 15 to be pushed forward into the guide groove 11 in the axial direction.

A grindstone shaft 18 to which the grindstone 17 is secured at the front end portion thereof is inserted into the center hole of the grindstone receiving body 3 and that of the sleeve-like member 10. The gindstone 17 is supported in the recess 9 in the main body 1 in such a manner that it can be moved in the axial direction and that it can be turned so as to vary its angular position, and is so disposed that its rear end portion is positioned in contact with the grindstone receiving body 3. The rear end portion of the grindstone shaft 18 projects rearwardly and outwardly from the sleeve-like member 10. A snap ring 19 is secured to the rear end portion of the rearwardly and outwardly projecting grindstone shaft 18. This snap ring 19 serves to prevent the grindstone shaft 18 from moving forward in the axial direction with respect to the sleeve-like member 10. The front end portion of the grindstone 17 projects forwardly and outwardly from the main body 1, and is disposed adjacent to the teeth of a saw chain that is engaged with a drive sprocket of the chain saw (not shown).

The sleeve-like member 10 is usually held in such a manner that its projection 15 is positioned in contact with the securing groove 16 at the rear end portion 12 of the main body 1. As a result of this, the grindstone 17 is positioned such as to be retracted from the passage through which the teeth of the saw chain move. When the teeth of the saw chain are set, the operator holds the grip portion 13 so as to make the projection 15 of the sleeve-like member 10 align with the guide groove 11 in the main body 1. As a result of this, the projection 15 fits into the guide groove 11 by virtue of the action of the compression coil spring 14, while the sleeve-like member 10, grindstone shaft 18, grindstone receiving body 3 and the grindstone 17 are together pushed forward with respect to the main body 1, the front end portion of the grindstone 17 thus being projected into the passage through which the teeth of the saw chain move so that the setting of teeth can be conducted. In this state, the grindstone 17 and the grindstone shaft 18 can be freely rotated, and this rotation can be easily confirmed by observation of the rotation of the rear end portion of the grindstone shaft 18 which projects rearwardly and outwardly over the sleeve-like member 10. When the setting of the saw chain teeth is adjusted, the screw 2 is rotated, and the head portion 7 thereof is moved forward or rearward with respect to the main body 1. As a result of this, changing of the position at which an engagement surface 20 of the grip portion 13 is engaged with an engagement surface 6 of the head portion 7 of the screw 2 along the axial line of the grindstone shaft 18 allows the setting of the teeth to be adjusted correctly. Any impact applied to the grindstone 17 during working will be absorbed by the compression coil spring 14.

We claim:

1. An automatic sharpener for a chain saw comprising: a main body to be mounted on a chain saw body; a grindstone receiving body which is urged forwardly with respect to said main body by a spring; a screw which is screwed into said main body and which is able to be rotated so as to move said grindstone receiving body forward or rearward with respect to said main body; a sleeve-like member which is supported by said main body in such a manner that it can be moved forward or rearward and can be turned so as to vary its angular position, and a rear end portion of which is projected rearwardly and outwardly from a rear end portion of said main body; a grindstone shaft which is rotatably supported by said sleeve-like member, whose front end portion inserted into said grindstone receiving body supports a grindstone, and a rear end portion of which is projected outwardly from the rear end portion of said sleeve-like member; securing means for holding said grindstone at the rear position against the force of said spring, and a grip portion provided at said rear end portion of said sleeve-like member which is provided for the purpose of releasing said securing means so that the grindstone may be pushed forward under the force of the spring.

2. An automatic sharpener for a chain saw according to claim 1, wherein the setting of the teeth can be adjusted by forming an engagement surface in said grip portion, forming an engagement surface in a head portion of said screw, and changing the position at which said two engagement surfaces engage with each other, said position being changed in the axial direction of said grindstone shaft.

* * * * *